United States Patent [19]

Poore et al.

[11] Patent Number: 4,738,463
[45] Date of Patent: Apr. 19, 1988

[54] AUTOMATICALLY COUPLING FLUID CONNECTOR FOR A HITCH

[75] Inventors: Bernard B. Poore, East Moline; Ronald E. Rohren, Moline, both of Ill.

[73] Assignee: Deere & Company, Moline, Ill.

[21] Appl. No.: 18,262

[22] Filed: Feb. 24, 1987

[51] Int. Cl.⁴ .............................................. B60D 1/08
[52] U.S. Cl. .................................... 280/421; 280/420; 280/461 A
[58] Field of Search ........... 280/420, 421, 422, 415 A, 280/461 R, 461 A

[56] References Cited

U.S. PATENT DOCUMENTS

| | | | |
|---|---|---|---|
| 3,279,827 | 10/1966 | Brown | 280/421 |
| 3,391,950 | 7/1968 | Carter et al. | 280/421 |
| 3,829,128 | 8/1974 | Sutton et al. | 280/415 A |

Primary Examiner—John J. Love
Assistant Examiner—Donn McGiehan

[57] ABSTRACT

An arrangement and assembly for making power connections during the hitching of an implement to a vehicle. The assembly includes mating halves of power connections located on hitch elements of the implement and vehicle respectively. Power connection halves are arranged so that the relative movement necessary between hitch elements of the implement and vehicle to accomplish their connection are also sufficient to cause coupling of the power connection. Alignment of the power connection halves is accomplished by a set of pins which engages a set of holes. The connector halves are resiliently mounted for axial movement in a direction parallel to the axis of the pins. Relative axial movement allows the power connections to be completed and the resilient mounting allows for a degree of axial misalignment.

13 Claims, 5 Drawing Sheets

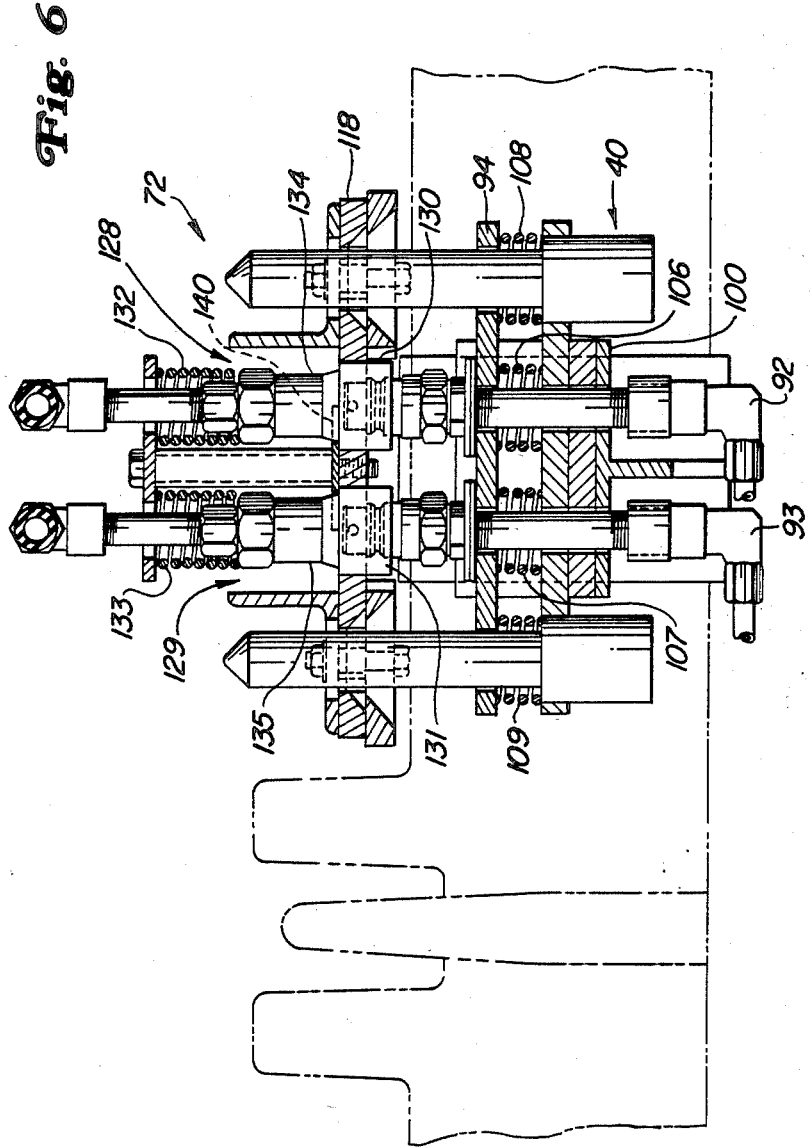

AUTOMATICALLY COUPLING FLUID CONNECTOR FOR A HITCH

BACKGROUND OF THE INVENTION

1. Field of the Invention

This invention relates generally to fluid connections and more particularly to automatically coupling fluid connectors.

2. Description of the Prior Art

Vehicle drawn implements are often supplied with power connections for transferring a power transfer medium between the vehicle and implement. When the implement is attached or hitched to the vehicle these connections are coupled to establish power communication. Such hitches and power connections are commonly found on agricultural and construction equipment. For purposes of convenience, in civilian applications, and safety, in military applications, many hitch assemblies are designed to automatically attach an implement to a vehicle from a remote operator station on the vehicle or implement. A fully automatic hitching operation requires a mechanized means for coupling power connections.

It is known in the prior art to resiliently mount the mating fittings of quick disconnect couplings on the drawn and drawing halves of a hitch, along with means for guiding the fittings such that the connection of the coupler can be made automatically as part of the hitching process. U.S. Pat. No. 4,368,899, issued to Swalley et al., depicts a hitch arrangement of this type. While this type of system illustrates automatic coupling of a fluid connector, it also requires that, in order to join the coupler halves, the actuator system supply additional motion beyond that necessary to join the hitch elements. Swalley et al. also teaches the use of a stabilizing rod to restrain movement of the connectors during the coupling process. The need to supply additional motion and the use of a stabilizing rod adds cost and complexity to the hitch system.

SUMMARY OF THE INVENTION

Accordingly it is an object of this invention to provide a hitch assembly having power connections that are automatically coupled during an automatic hitching operation using only the actuators and motion necessary for attaching hitch elements.

It is a further object of this invention to provide a hitch assembly having an arrangement that facilitates alignment of power connections for automatic coupling.

A yet further object of this invention consists of providing a power connection assembly for automatically coupling power connections of the quick disconnect type.

Therefore, in one aspect this invention comprises a hitch assembly for securing an implement to a vehicle and simultaneously completing power connections between the vehicle and implement. In simplest form, the vehicle and implement have load transfer members attached thereto, one or more actuators for engaging and disengaging the members, and means for securing the load transfer members to each other when engaged. Each load transfer member has a fitting comprising one half of a power connection associated therewith. Coupling of the fittings allows communication of a power transfer medium between the vehicle and implement, and uncoupling of the fittings prevents communication of the medium. Coupling and uncoupling of the parts is accomplished by relative motion between the vehicle and implement when engaging and disengaging the load transfer members.

In another aspect, the invention comprises a fluid connector assembly having sets of connectors with first and second fittings for communicating fluid therebetween when in a coupled position and interrupting fluid flow when in an uncoupled position. The fittings are separable along an axis and a latch on one of the fittings in each set is slidable along the axis in either direction. Sliding of the latch in one direction allows coupling and uncoupling of the fittings, and sliding of the latch in the other direction prevents uncoupling of the fittings. Each fitting is resiliently mounted to a subassembly with one subassembly having two or more guide pins fixed with respect to, and extending in the direction of, the axis. The other assembly has as many holes as guide pins defined therein for receiving the pins and a sliding plate for retaining and aligning the fittings when the pins extend into the holes.

Other objects, aspects and embodiments of this invention will become apparent from the following detailed description.

BRIEF DESCRIPTION OF THE DRAWINGS

FIG. 6 is a view of a coupler pair of FIG. 5 in a coupled position.

DESCRIPTION OF THE PREFERRED EMBODIMENT

Figure 1:
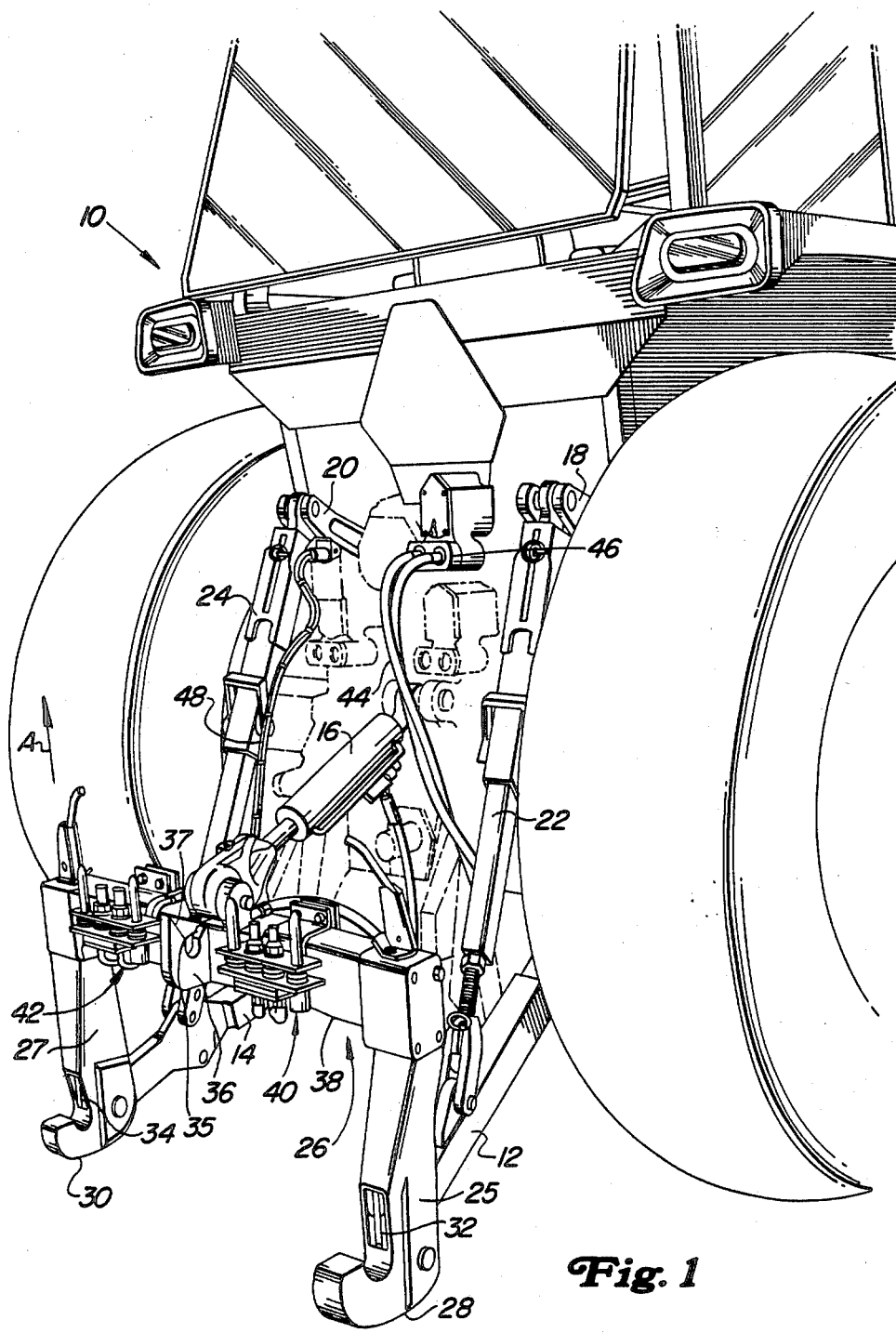
FIG. 1 is an isometric view of the back of a tractor with a three-point hitch.
Figure 2:
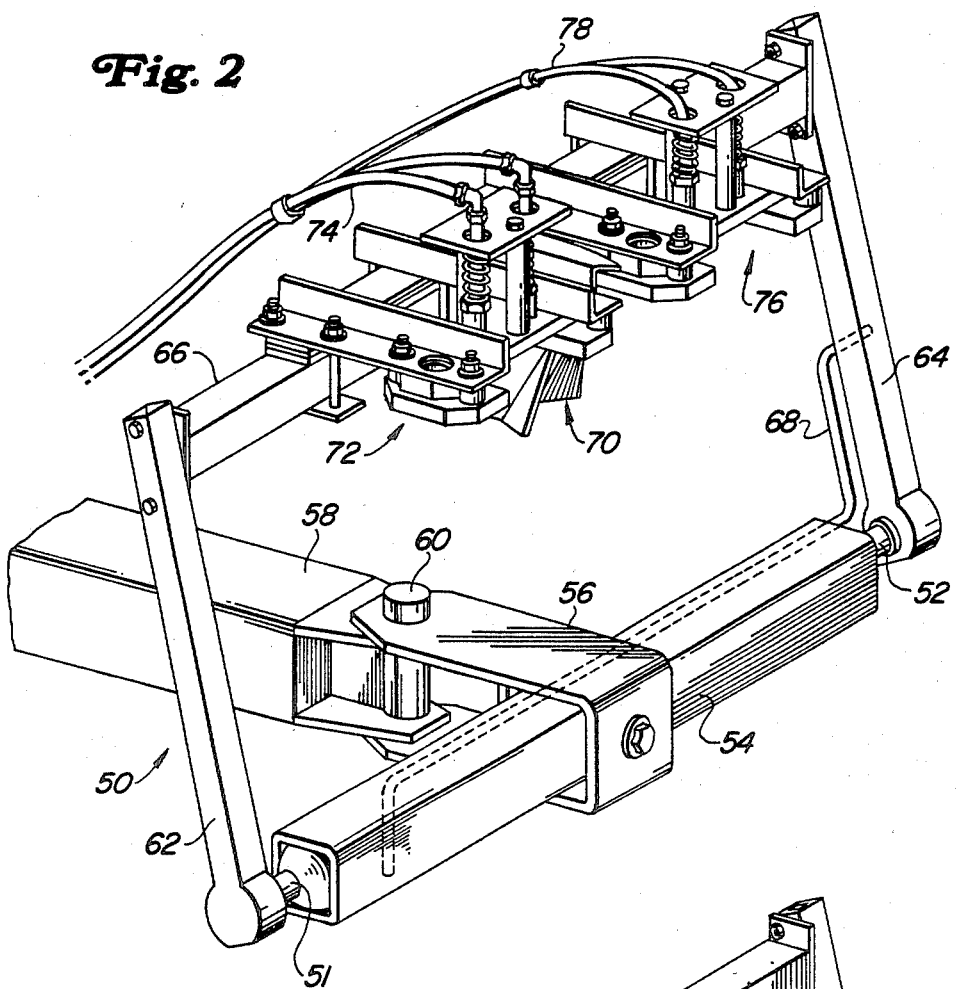
FIG. 2 shows a hitch structure on the front of an implement.

FIGS. 1 and 2 show a three-point hitch and a hitch structure for an implement having fittings for power connections attached thereto which are arranged in accordance with this invention. As hereinafter described, these fittings are automatically coupled or joined as the three-point hitch engages the hitch structure of the implement.

Looking then in detail at the three-point hitch and power connections, FIG. 1 shows the back of a tractor 10. A three-point hitch is affixed to tractor 10 and consists of a pair of drag links 12 and 14 and a top link cylinder 16. A pair of lift arms 18 and 20, connected to the drag links by lift links 22 and 24, control the elevation of the drag links 12 and 14. Proximal ends of the drag links and lift cylinder are attached to the tractor frame. Distal ends of the drag links are attached to the downwardly extending legs 25, 27 of an adapter 26. A pair of lower lift hooks 28 and 30 extend from the bottom of legs 25, 27 in a direction opposite drag links 12 and 14. Lift arms 18 and 20 move the adapter 26 in a direction A along a principal access of coupling motion, which in this case is vertical. A lock plate 32, 34, shown in a retracted position, can be positioned over the opening of each lift hook 28, 30 to retain a hereinafter described hitch pin in engagement therein. An upper lift hook 36 is positioned in the middle of a cross bar 38 which forms the top member of the adapter 26 and extends between legs 25, 27. The distal end of the link cylinder 16 is attached to cross bar 38 opposite lift hook 36.

The cross bar 38 has one fitting of each power connection fixed relative thereto. To the right of the upper lift hook, with respect to FIG. 1, a fitting assembly 40 having a pair of male quick coupler halves is attached to the cross bar. To the opposite side of the lift hook, a fitting assembly 42 having a pair of male electrical connectors 42 are attached to the cross bar. A pair of hydraulic hoses 44 communicate hydraulic fluid from hydraulic ports 46, located at the back of the tractor, to the quick coupler halves in assembly 40. A pair of electrical cables 48 also extend from the back of the tractor and are connected to electrical connectors in assembly 42.

The adapter hooks and male fitting assemblies cooperate with mating parts of an implement hitch structure 50 shown in FIG. 2. Lower lift hooks 28 and 30 engage the hitch pins 51 and 52 extending laterally from a T-bar 54. T-bar 54 is bolted about its center to a U-bracket 56. A pin 60 pivotally connects U-bracket 56 to a main member 58 which comprises the front of an implement. A pair of uprights 62 and 64 are pivotally attached to the ends of hitch pins 51 and 52, respectively. A lateral member 66 connects the upper ends of uprights 62 and 64. A torsion bar 68 acts against T-bar 54 and upright 64 to keep the uprights 62, 64 and lateral 66 biased into an upright position, as shown in FIG. 2. A suitable stop (not shown) prevents uprights 62, 64 and lateral 66 from rotating away from main frame main member 58 beyond the position shown in FIG. 2. Lateral 66 retains an upper hitch pin assembly 70 in its center. A fitting assembly 72 is bolted to lateral 66 to the right side of hitch pin assembly 70 and contains a pair of female quick coupler halves. A pair of hydraulic hoses 74 communicate hydraulic fluid from assembly 72 to a fluid powered device (not shown) on the implement. To the right of pin assembly 70 a fitting assembly 76, containing a pair of female electrical connectors, bolts onto lateral 66. A pair of electrical cables 78 conduct electrical power from assembly 76 to an electrically controlled device (not shown) on the implement.

Figure 3:
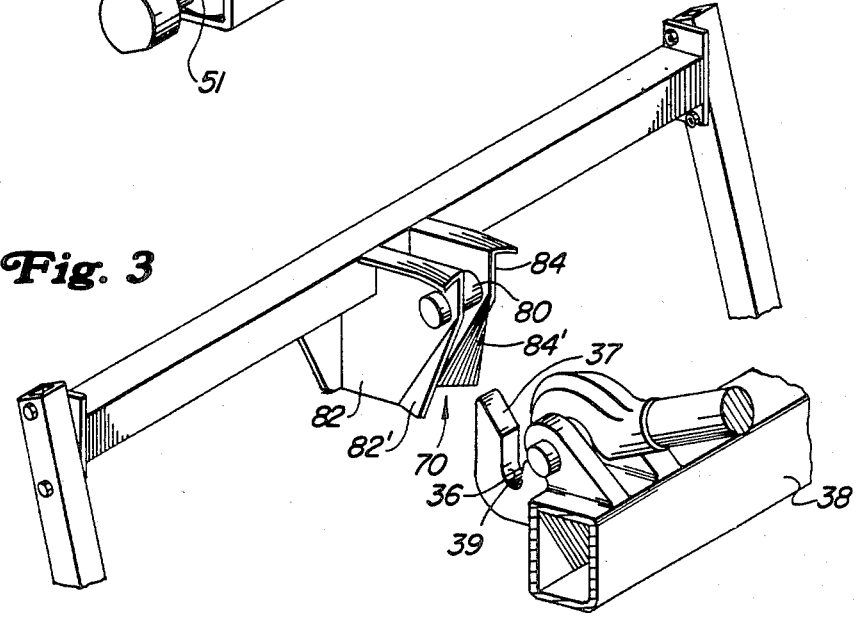
FIG. 3 is a view of a portion of the three-point hitch of FIG. 1 and a portion of the hitch structure of FIG. 2.

FIG. 3 shows lateral 66 with fitting assemblies 72 and 76 removed in order to more fully depict hitch pin assembly 70. Assembly 70 consists of a hitch pin 80 that straddles a pair of hitch plates 82 and 84. Hitch plates 82 and 84 are each flared outward over sections 82' and 84' to guidingly receive hook 36 as it engages hitch pin 80.

Figure 4:
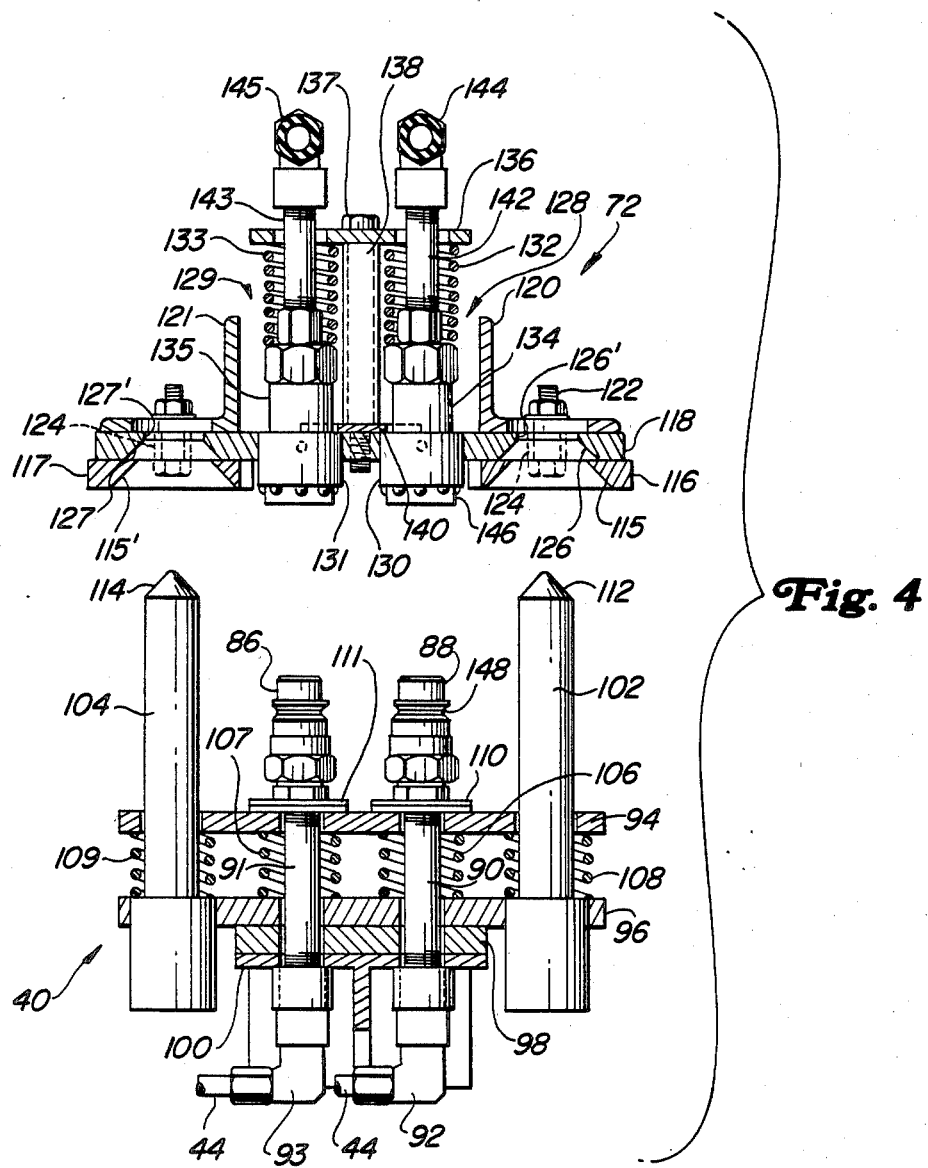
FIG. 4 shows a pair of separated hydraulic couplers associated with the hitch structure of FIG. 2 and the three-point hitch of FIG. 1.

FIG. 4 depicts hydraulic coupler assemblies 40 and 72 removed from the three-point hitch and implement hitch assemblies. Together, the two assemblies retain two pairs of quick disconnect couplings, the construction and operation of which are well known to those skilled in the art.

The lower coupler assembly 40 has two male quick coupler halves 86 and 88 of the quick coupler pair resiliently mounted therein. The male coupler halves are threaded onto a pair of pipe nipples 90, 91 which are in turn threaded onto a pair of elbows 92, 93 to which individual hoses of hose pair 44 are attached. Pipe nipples 90, 91 pass through a spring plate 94, a pin plate 96, a spacer plate 98 and an attachment plate 100. A pair of guide pins 102 and 104 are fixed to pin plate 96 at a location to the outside of male coupler halves 86 and 88. Guide pins 102 and 104 project through holes in spring plate 94. A series of springs 106, 107 surrounding pipe nipples 90, 91 and a series of springs 108, 109, surrounding pins 102 and 104, urge spring plate 94 upward against washer sets 110, 111 that surround pipe nipples 90, 91 at the base of male coupler halves 86, 88. The washers 110, 111 and springs 106, 107, 108, 109 act together to prevent relative axial movement between the male coupler halves 86, 88 and spring plate 94. Upward movement of the spring plates and coupler halves is limited by contact of elbows 92, 93 with the bottom surface of attachment plate 100. Spring pairs 106, 107 and 108, 109 allow downward axial movement of the coupler halves and spring plate 94. Transverse movement of the coupler halves is limited by interaction of the guide pins 102, 104 and the pipe nipples 90, 91 with spring plate 94. Accordingly, spring plate 94 serves to keep the coupler halves 86, 88 in a fixed transverse position relative to pins 102 and 104. Assembly 40 is fixed to the three-point hitch by attachment plate 100 which can be bolted to cross bar 38 (see FIG. 1) in any manner that will align guide pins 102 and 104 along the principle axis of coupling motion and prevent transverse motion relative to that axis. At the top of each pin 102 and 104 there is a cone portion 112 and 114 which locatingly engages conical portions of assembly 72.

Assembly 72 has two female coupler halves 128, 129 which are transversely fixed in a positioning plate 118. Positioning plate 118 is sandwiched between a pair of support plates 116, 117 on its lower side and a pair of support brackets 120, 121 on its upper side. A bolt and nut assembly 122, clamp support plates 116, 117 and support bracket 120, 121 together about a set of spacers 124 to maintain a groove that will allow sliding movement of positioning plate 118. Support plates 116, 117 define downwardly diverging, frusto-conical openings 115, 115' which are positioned to initially receive guide pins 102 and 104 as the coupler assemblies are brought together. Another set of downwardly diverging, frusto-conical openings 126, 127 are defined by positioning plate 118 and straddle female couplers 128, 129. Frusto-conical openings 126, 127 have cylindrical portions 126', 127' at their upper ends that are sized for a close running fit with pins 102 and 104. Female coupler halves 128, 129 and openings 126', 127' have relative center line locations that match the relative center line locations of male coupler halves 86, 88 and pins 102 and 104. Coupler halves 128, 129 are fixed into positioning plate 118 by securing their uncoupling sleeves 130, 131 into holes in positioning plate 118. A set of springs 132, 133 act against distal ends of coupler halves 128, 129 to bias coupler housings 134, 135 past sleeves 130 into a position permitting coupling or uncoupling of the male coupler halves. Coupling or uncoupling is permitted by allowing a series of lock balls 146, located around the circumference of housings 134, 135, to move outward with respect to the centerline of the female coupler halves so that the male coupler halves may be inserted or removed without interference between lock balls 146 and a pair of grooves 148, 149 extending circumferentially around the distal end of male coupler halves 86, 88. Springs 132, 133 act against a retaining plate 136 which is secured in fixed relationship to positioning plate 118 by a bolt 137. Bolt 137 is threaded into plate 118 and passes through a sleeve 138 and a backing plate 140 to maintain a fixed distance between the positioning plate and retaining plate. Backing plate 140 also extends over coupler sleeves 130, 131 to prevent upward axial movement of the sleeves relative to positioning plate 118. A pair of pipe nipples 142, 143 are threaded into the proximate ends of the female coupler halves and extend through holes in the retaining plate. The opposite end of pipe nipples 142, 143 thread into a pair of elbows 144, 145 having hydraulic hose pair 74 attached thereto.

Figure 5:
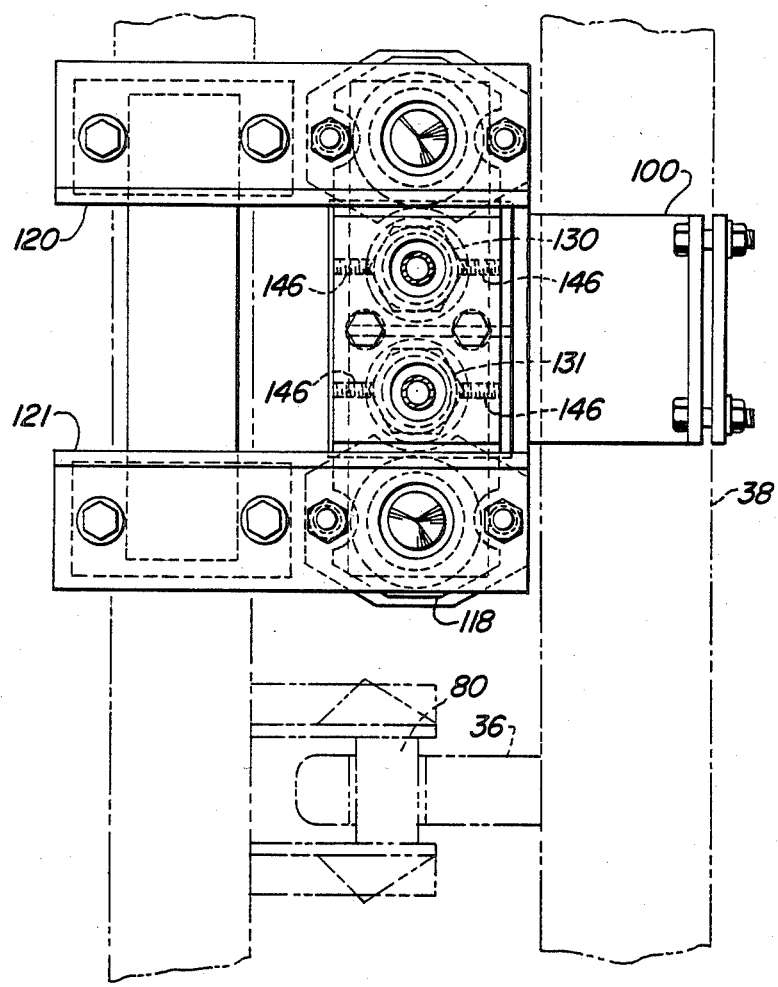
FIG. 5 is a top view of a portion of the hitch structure and coupler pair.

Further illustration of the relative positioning of coupler assemblies 40 and 72 is presented in FIG. 5. As shown in FIG. 5 support brackets 120, 121 and attachment plate 100 are bolted to lateral 66 and cross bar 38 such that the center line of the coupler halves and the pin and pin openings are in relatively close transverse alignment when upper lift hook 36 engages hitch pin 80. FIG. 5 also shows the means for securing the coupler sleeves in positioning plate 118 which consists of a pair of opposing setscrews 146, for each coupler sleeve, threaded into the sides of plate 118.

Electrical connector assemblies 76 and 42 may be arranged in a similar manner as the hydraulic couplers. The design of such connectors is easily accomplished by one skilled in the art of electrical connectors and needs no further clarification. The only essential requirements of the electrical connector is that connection and unconnection can be performed by relative movement between the connectors and that no lock mechanism be provided that would require additional manipulation of the connector before it can be connected or disconnected.

Operation

The simple operation and advantages associated with this invention can be more fully appreciated from a description of the coupling and uncoupling operation. The coupling operation begins with the adapter 26 positioned so that legs 25 and 27 contact corresponding hitch pins 51, 52. In this position the lower lift hooks 32, 34 are just below lift pins 51, 52 and, referring to FIG. 3, the back face of the cross bar 38 is in contact with the leading edge of hitch plate sections 82', 84', such that lift hook 36 is below hitch pin 80. To assure contact between cross bar 38 and plate sections 82', 84' top link cylinder 16 may be extended in an aft direction. Contact between lift hook 36 and the inner surface of plate section 82', 84', and contact between the legs 25 and 27 and hitch pins 51 and 52 serve to roughly align the male and female fitting assemblies 40, 72 and 42, 76. This preliminary alignment is sufficient to bring the pins 102, 104 of connector assembly 40 into axial alignment with the frusto-conical openings 115 and 115' of the support plate 116. Similar elements are provided for aligning the electrical connectors 76, 42 but are not described in order to simplify the specification and avoid needless duplication. Again this preliminary alignment of the connector assemblies has been brought about by normal procedures that would be performed to align the adapter plate and hitch assembly.

In the next part of the hitching sequence lift arms 18 and 20 raise drag links 12 and 14 via lift links 22 and 24 which in turn raises the entire adapter section 26. During initial raising of the adapter assembly conical portions 112 and 114 of pins 102 and 104 act against the conical surfaces of frutso-conical openings 115 and 115' to refine the alignment between the male and female connector assemblies. Refinement of the alignment between the cross bar 38 and lateral member 66 is assisted by cooperation of the angled surfaces 35, 37 of hook 36 that act on pin 80. Continued upward movement of the adapter section 26 with respect to hitch structure 50 moves conical points 112 and 114 of pins 102 and 104 into the frusto-conical openings 126, 127. The points 112, 114 act against the conical surface of openings 126, 127 to slide positioning plate 118 in a fore-and-aft or sideways direction with respect to the rest of connector assembly 72, so that female coupler halves 134, 135 are brought into precise axial alignment with male coupler halves 86, 88. With the coupler halves in alignment, further downward movement brings the open ends of housings 134, 135 over corresponding male coupler halves 86, 88. Springs 132, 133 bias housings 134, 135 towards coupler sleeves 130, 131 so that lock balls 146 can move outwardly with respect to the housing 134. Thus, the female coupler moves completely over the end of male couplers 86, 88 until lock balls 146 are aligned with grooves 148, 149. Additional downward movement of coupler assembly 72 with respect to coupler assembly 40 moves coupler housings 134, 135 upward with respect to sleeves 130, 131 and positioning plate 118. Relative movement between the sleeves 130, 131 and housings 134, 135 engages lock balls 146 with grooves 148, 149, and locks the male and female couplers together into the position as shown in FIG. 6. In this position, the female and male halves of the quick disconnect couplers are now solidly connected so that the internal mechanism of each coupler half (not shown) will permit fluid communication thereacross.

The springs 132, 133 of the assembly 72 are fewer in number and longer than the springs 106, 107, 108, 109 of assembly 40, therefore the female couplers will have a greater displacement per unit force relative to connector assembly 72 than the male couplers have relative to assembly 40. Accordingly, relative upward movement of assembly 40 will primarily cause upward movement of female coupler housings 134, 135, until sleeves 130, 131 are in their extreme distal position, with respect to coupler housings 134, 135, at which time no further movement can occur between the coupler housings 134, 135 and the rest of assembly 72. When sleeves 130, 131 are in an extreme distal position, hitch pins 51 and 52 are only slightly above the bottoms of hooks 28, 30. As the additional upward movement for fully seating pins 51 and 52 in hooks 28 and 30 moves connector assembly 40 upward with respect to connector assembly 72, spring plate 94 deflects downwardly to accommodate the additional relative movement between the fitting assemblies. Backing plate 140 provides extra restraint against upward movement of female coupler sleeves 130, 131 relative to the rest of connector assembly 72 under the higher spring forces associated with springs 106, 107, 108 and 109. Once pins 51 and 52 are resting on the bottoms of hooks 28 and 30, latch plates 32 and 34 are brought outward to retain the pins 51, 52 in the hooks.

To begin unhitching hitch structure 50 from the adapter 26 latch plates 32 and 34 are retracted and lift arms 18 and 20 are moved downward to lower draft links 12 and 14. As the adapter plate is lowered spring plate 94 moves upward relative to the fitting assemblies until the force from springs 106, 107, 108 and 109 equals the force of springs 132, 133. At this point, relative movement between the connector assemblies produces relative downward movement between female coupler housings 134, 135 and uncoupling sleeves 130, 131, and between spring plate 94 and the remainder of connector assembly 40, with proportionately more relative movement occurring in connector assembly 72. At some point relative downward movement between the uncoupling sleeves 130, 131 and the coupler housings 134, 135 will release lock balls 146 so that they can move outwardly and allow the male coupler halves 86, 88 to separate from female coupler halves 128, 129. When elbows 92, 93 contact attachment plate 100 and uncoupling sleeves 130, 131 are in their fully retracted position as shown in FIG. 4, the coupler halves separate. Continued lowering of the adapter 26 withdraws pins 102, 104 from the frusto-conical openings in positioning plate 118 and support plate 116 and the pins 51, 52 of hitch structure 50 from their associated hooks. When the adapter has been lowered to this point unhitching is complete and the tractor may be driven from hitch structure 50.

Although this invention has been described in the context of a specific embodiment, its possible application is not limited to the details disclosed herein. Accordingly this presentation is not meant to limit the scope of the appended claims.

We claim:

1. A hitch assembly for securing an implement to a vehicle and simultaneously completing power connections between said vehicle and implement, said assembly comprising:
    a first load transfer member attached to one of said vehicle and implement;
    a second load transfer member attached to the other of said vehicle and implement;
    a series of attachment points for securing said first member to said second member;
    means for releasably coupling the load transfer members to each other;
    an actuator assembly providing an attaching motion for moving the load transfer members together into a coupled position and providing a detaching motion for moving the load transfer members apart to an uncoupled position;
    a connector assembly for communicating a power transfer medium thereacross, comprising male and female fitting portions, said male portion having a resilient mounting on said first member and said female portion having a resilient mounting on said second member, said male and female portions being coupled and uncoupled by said attaching and detaching motion respectively;
    means in said connector assembly for aligning said male and female portions for coupling during said attaching motion; and
    a sleeve in said connector assembly slidable about one of said male and female fitting portions for locking said portions in a coupled position and unlocking said portions from said coupled position, at least one of said resilient mountings biasing said sleeve to an unlocked position.

2. The hitch assembly of claim 1 wherein said attaching and detaching motion are in a direction which is principally transverse to a fore-and-aft axis of said vehicle and said means for aligning said male and female portion allows relative movement of said portions in a direction perpendicular to said attaching and detaching motion.

3. The hitch assembly of claim 1 wherein said alignment means includes a set of pins extending parallel to the direction of said attaching and detaching motion and a plate slidable in a direction transverse to a longitudinal axis of said pins, said plate having holes for receiving said pins and one of said male and female fitting portions located thereon.

4. The hitch assembly of claim 1 wherein said first load transfer member is a three point hitch, said three point hitch is attached to a tractor, and said connector assembly communicates fluid pressure and comprises a vertically oriented quick disconnect coupling.

5. The hitch assembly of claim 1 wherein said connector assembly communicates electrical current and said male and female portions contain electrical contacts.

6. A hitch assembly for attaching an implement to a vehicle and simultaneously coupling a fluid connector for communicating fluid pressure between said vehicle and implement, said assembly comprising:
    a first member attached to said vehicle having a series of attachment hooks;
    a second hitch member attached to said implement having a series of pins engageable by said attachment hooks;
    an actuator assembly for moving said first hitch member in a direction transverse to said second member and engaging said pins in said hooks;
    a fluid connector having:
        a male and a female fitting, said male and female fittings being movable between coupled and uncoupled positions by relative axial movement between said fittings;
        means for locking said fittings in said coupled position and unlocking said fittings from said coupled position, said means being biased to unlock said fittings;
        a first plate having one of the male and female fittings attached thereto and resiliently mounted thereon to allow movement of said one fitting in said transverse direction;
        a set of guide rods fixed to one of said first and second plates, said rods extending in said transverse direction; and
        a set of guide holes defined by the other of said plates, said rod holes receiving said rods to align said male and female fittings.
        a set of guide rods fixed to one of said first and second plates, said rods extending in said transverse direction and a set of guide holes defined by the other of said plates, said rod holes receiving said rods to align said male and female fittings.

7. The hitch assembly of claim 6 wherein said male and female fittings comprise a quick disconnect type coupler and said locking and unlocking means includes a sleeve surrounding one of said male and female fittings and slidable relative thereto, said sleeve being fixed to one of said plates.

8. The hitch assembly of claim 7 wherein said sleeve surrounds the female fitting and a resilient member biases said female fitting to an unlocked position.

9. The hitch assembly of claim 8 wherein said female fitting has an open end about which said sleeve is located and a closed end against which a first spring acts to bias said female fitting to an uncoupled position, with the attachment of said sleeve and said first spring providing said resilient mounting, and said male fitting is resiliently mounted via a second spring, said second spring biasing said male fitting toward said female fitting and having a higher spring constant than said first spring.

10. The hitch assembly of claim 9 wherein said male and female fittings are attached to said first and second plates respectively and the open end of said female fitting is directed downward.

11. A fluid connector assembly comprising: at least one fluid connector having first and second fittings for communicating fluid therebetween when in a coupled position and interrupting fluid flow when in an uncoupled position, said fittings being separable along an axis, and a latch on said first fitting, said latch being slidable parallel to said axis in a first relative direction to allow coupling and uncoupling of said fittings and slidable in a second relative direction to prevent uncoupling of said fittings;
- a first subassembly having said first fitting resiliently mounted thereon, the resilient mounting biasing said latch in said first direction;
- a second subassembly having said second fitting resiliently mounted thereon;
- at least two guide pins fixed with respect to one of said first and second subassemblies and extending in the direction of said axis;
- a hole defined in the other of said first and second subassemblies for each of said pins, said holes having a location that will align said fittings when said pins extend through said holes; and
- means for mounting at least one of said subassemblies that allows relative transverse movement of the fittings located thereon in a direction perpendicular to said axis.

12. The assembly of claim 11 wherein the resilient mounting of said second subassembly has a greater displacement force than the resilient mounting of said first subassembly.

13. The assembly of claim 12 wherein said first and second fittings comprise female and male fittings, respectively, of a quick disconnect type coupler, said latch comprises a sleeve fixed to said first subassembly, and a spring acts against a closed end of said first fitting to bias said sleeve in said first direction.

* * * * *

UNITED STATES PATENT AND TRADEMARK OFFICE
CERTIFICATE OF CORRECTION

PATENT NO. : 4,738,463

DATED : 19 April 1988

INVENTOR(S) : Bernard Brandt Poore et al.

It is certified that error appears in the above-identified patent and that said Letters Patent is hereby corrected as shown below:

Col. 8, line 8, after "first", insert -- hitch --; and delete lines 35 - 40, inclusive.

Signed and Sealed this

Twenty-eighth Day of February, 1989

Attest:

DONALD J. QUIGG

Attesting Officer     Commissioner of Patents and Trademarks